(12) United States Patent
Guzman et al.

(10) Patent No.: US 8,186,607 B2
(45) Date of Patent: May 29, 2012

(54) HYBRID IRRIGATION SYSTEM

(75) Inventors: Amado Guzman, Tucson, AZ (US);
Randolph E. Scheffel, Castle Rock, CO (US)

(73) Assignee: G&S Partners, Castle Rock, CO (US)

( * ) Notice: Subject to any disclaimer, the term of this patent is extended or adjusted under 35 U.S.C. 154(b) by 692 days.

(21) Appl. No.: 12/263,391

(22) Filed: Oct. 31, 2008

(65) Prior Publication Data

US 2009/0230207 A1    Sep. 17, 2009

Related U.S. Application Data

(60) Provisional application No. 61/036,162, filed on Mar. 13, 2008.

(51) Int. Cl.
*C22B 3/00* (2006.01)
*C22B 3/02* (2006.01)
*C22B 3/04* (2006.01)

(52) U.S. Cl. ........ 239/101; 266/114; 266/134; 266/168; 423/658.5

(58) Field of Classification Search ........................ None
See application file for complete search history.

(56) References Cited

U.S. PATENT DOCUMENTS

| | | | | |
|---|---|---|---|---|
| 4,239,286 A | * | 12/1980 | Coursen | 299/4 |
| 4,756,887 A | * | 7/1988 | Lesty et al. | 423/20 |
| 5,030,279 A | * | 7/1991 | Krauth | 75/712 |
| 6,053,964 A | * | 4/2000 | Harrell | 75/712 |
| 2005/0103162 A1 | * | 5/2005 | Kohr et al. | 75/721 |
| 2006/0090602 A1 | * | 5/2006 | Batterham et al. | 75/743 |

OTHER PUBLICATIONS

International Search Report and Written Opinion for PCT/US08/82335 filed Nov. 4, 2008, dated Dec. 22, 2008.

* cited by examiner

*Primary Examiner* — Jerry Lorengo
*Assistant Examiner* — Jared Wood
(74) *Attorney, Agent, or Firm* — Scott A. Felder; Wiley Rein LLP

(57) ABSTRACT

An improved method and system is described for applying a leach solution to ore in the process of heap leaching. The Hybrid Irrigation System (HIS) relies on both surface solution delivery techniques as well as sub-surface solution application to improve the solution uniformity and metallurgical performance of a leaching process. The methods and systems allow for controlled application of leach solution with a hydraulic head applied that can be adjusted or varied depending on the conditions of the ore from negative, atmospheric or positive pressure, while distributing leaching solution in a uniform manner independent of surface variability with respect to elevation and infiltration capacity of the ore surface. The systems and methods have particular application to low permeability ores like high clay content copper, silver, uranium, and gold ores and nickel/cobalt laterite, but can be used in any heap leach application where control must be maintained with respect to surface ponding, stability and accessibility, and uniform reagent distribution, resulting in improved leaching performance.

24 Claims, 5 Drawing Sheets

HYBRID IRRIGATION SYSTEM

CROSS-REFERENCE TO RELATED APPLICATIONS

This application claims the benefit of U.S. provisional application No. 61/036,162, filed 13 Mar. 2008, which is hereby incorporated by reference as though fully set forth herein.

BACKGROUND OF THE INVENTION a. Field of the Invention

The present invention is relevant to percolation leaching of metal or mineral ores. More specifically, the present invention encompasses methods and systems for delivery of leaching solution (e.g., lixiviant) onto the surface of the ore as well as the subsurface of the ore. The subsurface solution delivery systems provide for the delivery of solution at varying depths and varying pressures to the heap, which provides a significant benefit over systems in use today.

b. Background

Heap and dump leaching of gold, copper, uranium, nitrates and other metals and/or minerals has been used commercially on a significant basis since the early 1900s. The method of applying the various leach solutions, predominantly water, water with cyanide, and water with sulfuric acid, has varied greatly over time depending on the local atmospheric conditions and, most importantly, the permeability and physical character of the ore, but has been typically limited to the application of such solutions to the surface of the ore.

Early leaching used simple flooding of the surface with water and/or a water and chemical mixture. With the development of sprinklers, (e.g., RAINBIRD® or equivalent), this type of solution distribution became the common practice. Problems associated with the use of sprinklers are evaporation, heat loss, wind loss, and potential damage to the surface of the heap. The principal sprinkler application today is typically limited to lower pressure, controlled droplet size "wobblers," such as the Senninger WOBBLER®. This method is mostly used on more competent ores where heat loss, wind loss, evaporation, or ore degradation on the surface are not of significant concern.

Various forms of drip irrigation were developed, primarily in the southwest US in the early to late 1960s, with the use of the Bluebird "needle valves" (controlled dripping) used at the Ranchers' Exploration and Development Corporation's Bluebird mine near Miami, Ariz.; the Bagdad wobblers (surgical tubing of small diameter allowed to "wobble" due to the pressure gradient) used by Bagdad Mining Company near Bagdad, Ariz.; and the small diameter polyethylene or plastic tubing used by Miami Copper, subsequently Cyprus Minerals Corporation, near Miami, Ariz. being early examples of the industrial application of these types of solution delivery systems in the mining business.

In recent times, labyrinth type drippers, such as the types described in U.S. Pat. Nos. 5,005,806, 5,030,279, and 4,960,584, developed primarily for the agricultural industry, have been almost exclusively used in the gold and copper industry where the ore character requires drip irrigation. Experimental evidence at the industrial scale shows that under limited hydraulic conductivity of the surface (natural or otherwise), dripper irrigation results, in many instances, in preferential flow paths which limit reagent delivery at depth which necessarily imposes long-leach cycles and sub-optimal use of water and reagents.

Most recently, the application of heap leaching is being attempted on nickel/cobalt laterite ores and other high clay content ores. Nickel/cobalt laterite and other high clay content ores have a character, due to the very high fines content and the degradation with the high acid consumption, that require special solution application methods to deal with low-permeability ores, operating at a high degree of saturation (moisture content) that limits access to the surface, with potential for loss of control on the solution application associated mainly to the reduction of permeability of the heap surface with time. An additional complication with nickel/cobalt ore and/or other high calcium and magnesium ores is scaling, which also complicates the solution distribution system.

Therefore, there exists a significant need in the art to provide for methods and systems to facilitate efficient leaching of difficult to manage heaps in an economical fashion. One object of the present invention is to provide for improved methods and systems for active heap management through the combination of surface and subsurface delivery of leach solutions to heaps.

BRIEF SUMMARY OF THE INVENTION

The methods and systems for solution application of the present invention are specifically designed to improve solution delivery by taking advantage of the forces involved with solution movement through problematic ores (including, but not limited to, nickel/cobalt laterite ores) where a high level of fines imposes a low permeability resulting in the problems discussed above, but also on more permeable ores where poor solution distribution controls penetration of the leaching front impacting leaching kinetics.

The present invention is, in one form, a system for delivery of a leach solution to an ore heap in the process of percolation leaching. The system comprises a main conduit for leach solution delivery from a reservoir, a surface solution delivery system connected to the main conduit comprising surface emitters distributed over a portion of a surface of the heap, and a sub-surface delivery system connected to the main conduit for leach solution delivery to a portion of the ore below the surface of the heap. The sub-surface delivery system comprises sub-surface solution applicators configured to extend a preset distance into the heap and to deliver leach solution into the ore via numerous delivery points. The sub-surface solution applicators can be configured to deliver leach solution at preset pressures, such as below atmospheric pressure, at atmospheric pressure, or above atmospheric pressure. Moreover, the sub-surface solution applicators can be disposed within the heap in a substantially vertical or non-vertical position, can extend into the heap between about 0% and about 85% of an overall ore heap depth measured from the top surface of the heap, or can be configured and disposed in the ore at a sufficient depth to reduce heat loss and solution evaporation. Optionally, the sub-surface delivery system may include at least one sub-surface drip irrigation pipe extending into the ore heap, and the sub-surface solution applicators may be connected thereto. Solution delivery via the sub-surface solution applicators results in enhanced metallurgical performance of the ore and facilitates leaching of taller heaps. Additionally, solution delivery via the sub-surface solution applicators may result in increased utilization of the leach pad and a maximization of the return on capital investment in the heap pad and associated appurtenances. Additionally, the leach solution can be distributed in substantially uniform fashion at a composite average rate from the surface emitters and sub-surface solution applicators such that it is sufficient to affect leaching and mineral/metal removal from the ore at an economical rate, or the leach solution can be distributed at an average solution flow rate in the range of about 0.1 L/hr/m$^2$ to about 50 L/hr/m$^2$. Finally, the heap can comprise low permeable ore.

In another form, the current invention is a system for delivery of a leach solution to a nickel laterite ore heap in the process of percolation leaching. The system comprises the main conduit for leach solution delivery from a lixiviant reservoir, a surface solution delivery system connected to the main conduit comprising surface emitters distributed over a portion of the surface of the heap, and a sub-surface delivery system connected to the main conduit for leach solution delivery to a plurality of locations within the nickel laterite ore at any depth. The sub-surface solution delivery system comprises sub-surface solution applicators configured to extend a pre-determined distance into the ore and to deliver leach solution into the heap through numerous delivery points. Solution delivery via the sub-surface solution applicators may result in decreased leach time, improved wetting, and improved leaching of deeper ore-stacks.

In another form, the present invention is a method for applying a leach solution to an ore heap which better matches ore permeability and reagent demand during a leaching process. The method comprises the steps of providing an irrigation system for delivering a leach solution and reagents to the heap; providing an irrigation system that facilitates delivery of the leach solution to numerous locations within the ore at varying depths; and providing an irrigation system that delivers the leach solution and reagents to the surface and sub-surface of the heap at pre-determined pressures so as to leach the ore more efficiently. The leaching solution can be applied under positive, atmospheric or negative pressure conditions via the sub-surface solution applicators to improve solution distribution while matching the hydraulic properties of the ore and the conditions arising from the leaching process. Beneficially, the sub-surface solution applicators promote more uniform metal recovery throughout the ore heap. Additionally, the sub-surface solution applicators can comprise multiple solution delivery points providing for delivery of solution at varying depths within the sub-surface solution applicators, or the leaching solution can be dispensed directly onto the uppermost surface of the ore mass in overlapping wetting patterns.

It is an object of the present invention to provide a method to improve and expedite solution and reagent delivery over the whole ore mass.

It is a further object of the invention to provide an apparatus comprising a plurality of sub-surface solution applicators to form a sub-surface distribution network to more efficiently distribute solution and reagents into the heap.

Additionally, it is an object of the invention to provide a surface solution delivery system comprising a plurality of surface emitters which can be operated in combination with the sub-surface delivery system to improve distribution of solution/reagents throughout the ore. It is an additional object of the invention to provide a method of increasing the rate at which the metals/minerals are extracted.

The present invention provides a number of advantages over other solution delivery systems and methods, including:

Application of the hybrid irrigation system is not limited to marginally permeable ore but would equally improve solution/reagent delivery, and hence metallurgical performance, of permeable ores.

The surface component of the hybrid irrigation system requires no special materials beyond currently available commercial piping and tubing for delivering said solution.

Implementation of the hybrid irrigation system would avoid the need of re-mining, a practice that turns over the ore some time during the leach cycle to expose the ore at depth and enhance the opportunity for ore-solution contact.

By facilitating and expediting solution delivery, implementation of the hybrid irrigation system reduces the leach cycle with respect to the standard surface irrigation techniques currently used worldwide.

Because the solution delivery occurs at depth (as well as on the surface of the ore), there is a proportional reduction in the heat loss resulting from surface solution evaporation.

The evaporation losses resulting from the implementation of the hybrid irrigation system are proportionally smaller compared to actual solution volume delivered to the ore when contrasted with standard methods that rely solely in surface solution application. The hybrid irrigation system benefit is paramount in arid environments where water conservation is a critical operational commitment.

Because solution is delivered both on the surface and sub-surface, the hybrid irrigation system reduces stratification of metal recovery, a problem that has plagued the leaching industry since its inception.

Heat conservation is not only critical in assisting leaching thermodynamics but would also decrease the potential surface scaling arising from chemical precipitation induced by drastic drops in temperature associated to solution evaporation and pressure drops resulting from surface delivery. The heat conservation from the hybrid irrigation system becomes more significant when leaching solutions are near chemical saturation.

The hybrid irrigation system facilitates delivery of leaching solution to a problematic ore by adjusting the hydraulic head for the in-situ permeability changes, as well as differential settlement and surface elevation changes. By adjusting the hydraulic head, the hybrid irrigation system matches the hydrodynamic properties of the ore with appropriate application rate.

By enhancing metallurgical performance of the ore, implementation of the hybrid irrigation system will facilitate leaching of taller ore heaps increasing the utilization of the leach pad and maximizing the return on capital investment on the heap pad and associated appurtenances.

If the sub-surface solution applicators are connected to a compressed air (or other gas-phase reagent) delivery system, they can be used to deliver gas-phase (e.g., oxygen, water vapor, steam) reagents to specific depths on the ore stack to support reagent demands from the leaching process.

Various other features, objects and advantages of the invention will be made apparent from the following descriptions together with the drawings.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
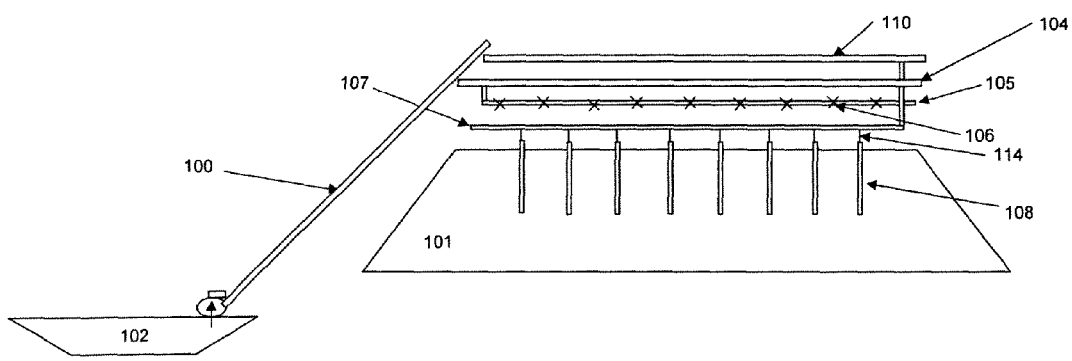
FIG. 1 is a diagrammatic side view of a system in accordance with one embodiment of the present invention.

It is known that the flow of a leaching solution in a variably saturated medium can be represented by the following equation:

$$q = -K(\Psi)\nabla(\Psi+z)$$

Where: q=the solution flux (L/T)
z=the vertical coordinate with respect to a given reference (L); and
$\nabla$=the gradient operator (1/L).
$\Psi$=the pressure head (called suction, capillary pressure and pore pressure among the various disciplines) expressed in terms of the equivalent column of water (L); and
$K(\Psi)$ the hydraulic conductivity as a function of the pressure head (L/T).

The pressure head ($\Psi$=p/$\gamma$; the hydraulic pressure divided by the specific weight of the fluid) is negative when the ore material is partially saturated and positive when the ore is fully saturated. The above equation indicates that solution flux (volumetric flow per unit area, Q/A) in a variably saturated medium results from the gradient of surface forces—($\nabla\Psi$) arising from capillary mechanisms within the ore and the gradient of "body" forces ($\nabla z$), potential energy, arising from the gravitational effect on the fluid mass. These hydrodynamic forces constitute the main driving mechanisms for solution movement in a variably saturated ore.

As indicated in the above equation, the hydraulic conductivity, $K(\Psi)$, is a function of the pressure head (pore pressure) and varies from its maximum value at full saturation (the saturated hydraulic conductivity) to essentially zero when the ore reaches its residual saturation. Therefore, the ability of the ore to accept leaching solution is not a constant but depends on the state (as determined by the capillary pressure) of the ore. The relationship between hydraulic conductivity and the hydraulic head is strongly non-linear. Understanding this correlation is critical to properly designing an irrigation system that optimizes the metallurgical response of a particular ore.

Recent studies by the inventors and others have shown that with drip irrigation it is sometimes required to apply solution on close spacing, e.g., about 40 cm×40 cm or less, to maximize solution uniformity and improve leaching kinetics. However, existing irrigation systems are not necessarily compatible with high levels of dissolved matter in leaching solutions, ambient conditions in mine environments (high temperature swings due to high altitudes, etc.) and the operating pressures required to deliver the proper application rate.

The present invention includes a method and apparatus for delivering a leach solution to an ore heap for percolation leaching. In accordance with the current invention, methods and systems are provided for delivering leaching solution in a controlled manner to address the variability of the ore hydraulic conductivity through a plurality of sub-surface applicators and/or drip-emitter pipes or tubes connected to a main conduit. Such a solution delivery system can be used in combination with standard surface solution delivery methods, e.g., commercial "drip-irrigation" piping and/or wobblers, connected to the same or its own solution conduit to better match the hydraulic character of the ore at any specific time in the leaching cycle. As such, the methods and systems in accordance with the current invention include a combination of standard surface irrigation equipment and a multiplicity of sub-surface solution applicators. As used herein, the term "sub-surface solution applicator" refers to an apparatus that applies the leaching solution at depth within the ore heap. The proportion of solution applied via surface versus sub-surface depends on the balance of hydrodynamic forces (a function of the content of fines, density and time under irrigation) controlling solution movement through the ore as well as on the reagent demand as required by the leaching process.

Embodiments of the current invention are summarized graphically in FIGS. 1-4, where the primary leach solution feed is distributed from the reservoir to the surface through a main line and then through a series of ever-decreasing pipe diameters as the flow to the heap surface is subsequently distributed.

FIG. 1 is a diagram of a heap vertical cross-section in accordance with one embodiment of the present invention. FIG. 1 illustrates an example of a layout for the solution delivery system in accordance with the present invention. Preferably, a main conduit 100 delivers solution from a lixiviant reservoir 102 to the uppermost surface of the ore bed (heap 101) where pressure gauges, valves and/or pressure reducers facilitate delivery of a predetermined, uniform by design, flow rate to the surface sub-header pipe 104 which supplies a reasonably constant hydraulic head such that solution flow to the surface drip-irrigation pipe 105 and the individual surface emitters 106 is also maintained constant. Leaching solution to the "sub-surface solution applicators" 108 is also delivered via a dedicated sub-header pipe 110, drip-irrigation pipe 107, small diameter secondary tubing 114, and associated drip emitter or other solution control device, as required by the ore hydraulic and other metallurgical conditions, to ensure consistent solution application as a function of time. The small diameter secondary tubing 114 is comprised of a suitable tubing material to drive solution from the dedicated sub-header pipe 110 and drip-irrigation pipe 107 to the sub-surface solution applicator 108 itself. One of ordinary skill in the art will appreciate that other conduits, such as drip tubes and drip emitters, may also be utilized without departing from the scope of the present invention. The use of multiple reservoirs 102 (e.g., a first reservoir to supply surface sub-header pipe 104, drip-irrigation pipe 105, and surface emitters 106 and a second reservoir, optionally including a gas-phase reagent reservoir, to supply sub-header pipe 110, drip-irrigation pipe 107 and sub-surface solution applicators 108) is also contemplated.

Figure 2:
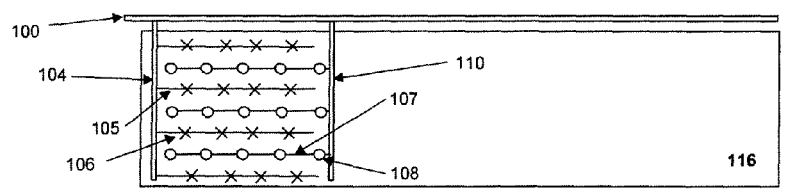
FIG. 2 is a diagrammatic top view of a system in accordance with one embodiment of the present invention.

FIG. 2 shows a top-view of one embodiment of the present invention exemplifying the distribution of the surface emitters 106 and the sub-surface solution applicators 108 along a portion of the heap surface 116. The sub-surface solution applicator 108 may be inserted by any number of known methods. For example, at least one orifice that is drilled, augered, or constructed by insertion and removal of a solid pipe or rod may be provided through which the sub-surface solution applicator is inserted into the heap. The sub-surface solution applicator 108 is then fed solution via the small diameter secondary drip tube 114, e.g., a tube or pipe. The small diameter secondary drip tube 114 may be inserted into the sub-surface solution applicator 108, along with associated drip emitter or other solution control device as appropriate for hydrometallurgical characteristics of the ore. The sub-surface solution applicator 108 can be variable in diameter and depth to suit the specific requirements of the ore being leached. The small diameter secondary drip tube 114 design varies depending on whether the process requires a constant solution application rate or a constant hydraulic head, or both. The open area (flow area) of the sub-surface solution applicator 108 depends on the hydraulic characteristics of the ore and on whether constant pressure or constant flow is required. A practical range of size for the sub-surface solution applicator 108 is a diameter from about 4 mm to about 150 mm, or whatever is practical, with the depth being about 0% to about 85% of the overall heap height (or larger depending on the heap design). Pressure control (negative, atmospheric or positive) is achieved by suitable pressure regulating devices along the delivery line or placed directly into the sub-surface solution applicator 108.

Figure 3:
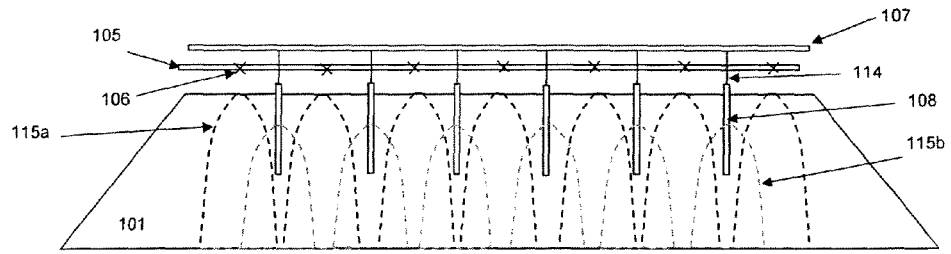
FIG. 3 is a diagrammatic profile/cross-sectional view of a system in accordance with one embodiment of the present invention.

FIG. 3 shows a diagram of a cross-sectional view of a system in accordance with one embodiment of the present invention. FIG. 3 also shows the respective wetting fronts 115a and 115b of surface emitters 106 and sub-surface solution applicators 108.

The main conduit(s) 100 receive(s) and distribute(s) the leaching solution to the heap surface 116 which it is then sent to either the surface emitters 106 (e.g., commercial drip emitter or other design and/or spray nozzle) or the sub-surface solution applicators 108. The surface emitters 106 may be as known to those of ordinary skill in the art. Examples of suitable surface emitters include those disclosed in U.S. Pat. Nos. 5,005,806; 5,030,279; 4,960,584; 6,149,711; and 6,743,276 (the contents of which are incorporated by reference herein).

FIGS. 4a-d are exemplary embodiments of the sub-surface solution applicators.

The sub-surface solution applicators 108 deliver leaching solution/reagents at depth into the ore mass. The type of sub-surface solution applicator 108 depends on the desired mode of application (pressurized, atmospheric pressure or suction). The sub-surface solution applicator 108 can be designed to deliver solution at varying pressure and in varying configurations depending upon the requirements of the heap design and the ore to be leached.

For example, the sub-surface solution applicator 108 can be an open-ended pipe (e.g., slotted or perforated) configuration in which the delivery pressure is essentially atmospheric pressure. In such a configuration, the depth of the pipe allows the delivery pressure to adjust to better match the ore conductivity (e.g., FIG. 4a). Under this configuration, solution is delivered via a small secondary drip tube 114 and outfitted with a commercial drip emitter or other pressure dissipation device 112 such that irrigation occurs under atmospheric pressure. The actual sub-surface solution applicator 108 can be installed in an over-sized hole (left side of FIG. 4a) such that the solution fills out the annular space between the applicator and the ore. In an alternative construction, the sub-surface solution applicator 108 is in direct contact with the ore and the solution is delivered via the slots or perforations on the body of the applicator as illustrated on the right side of FIG. 4a.

Figure 4A:
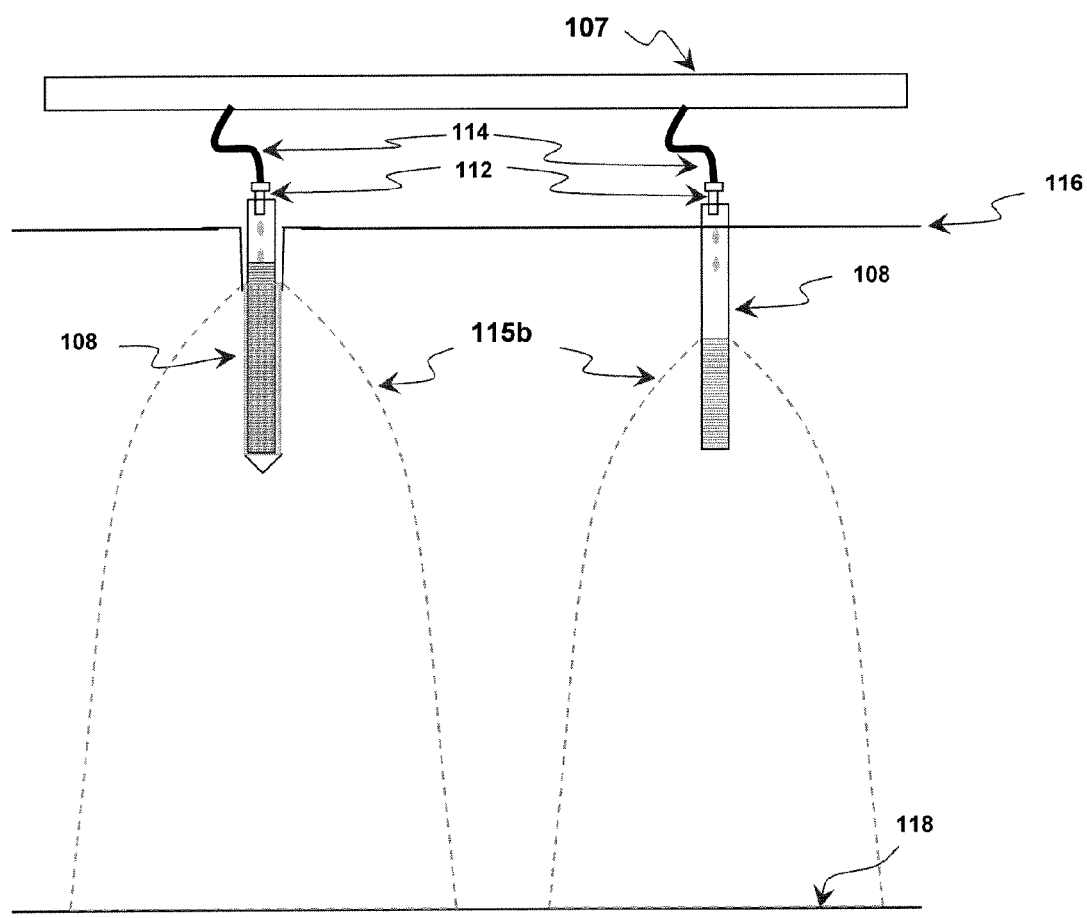
FIGS. 4A-4D are exemplary embodiments of the sub-surface solution applicators in accordance with the present invention.
Figure 4B:
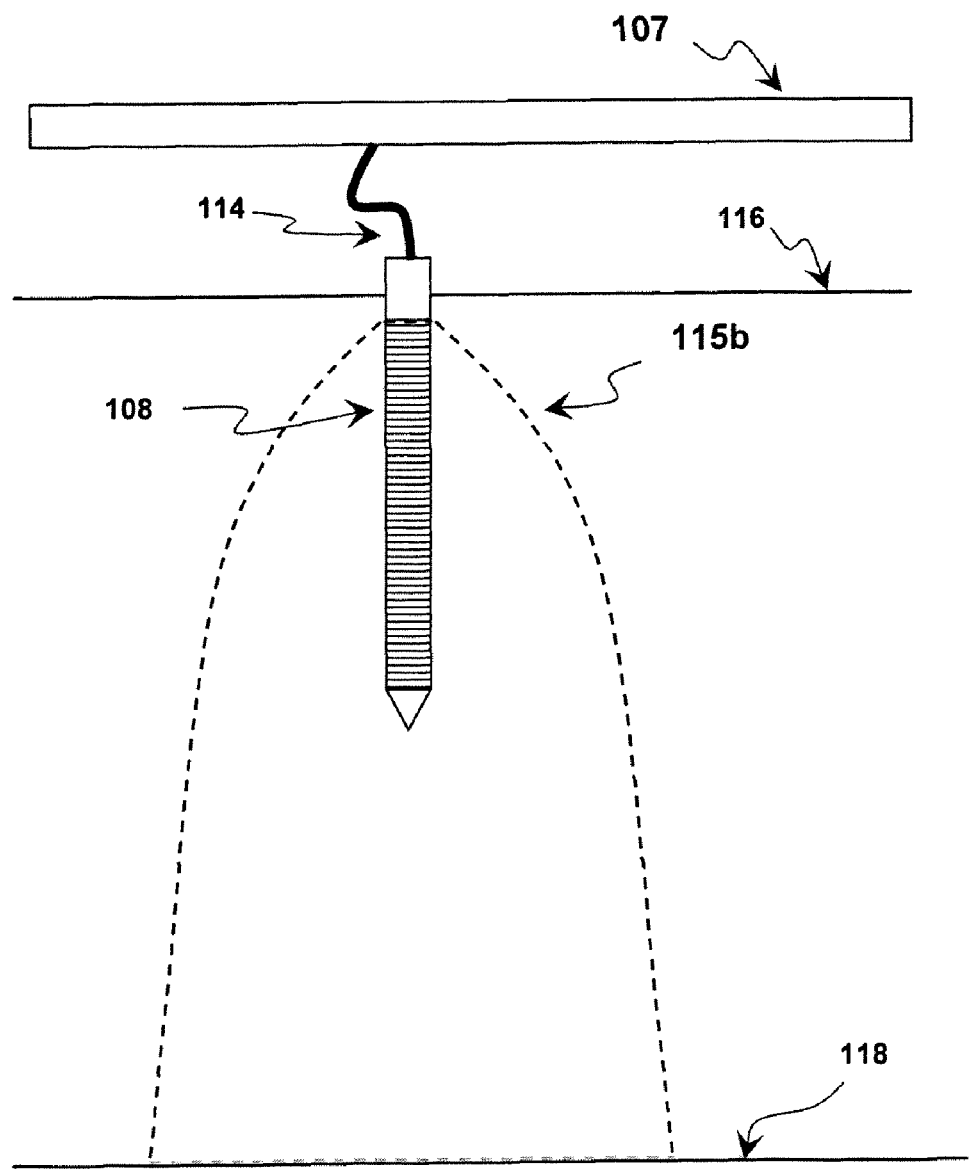

Alternatively, the sub-surface solution applicator 108 can be a closed-pipe configuration, which allows for solution delivery under pressurized conditions as determined by the pressure in the dedicated sub-header pipe 110 or the drip-irrigation pipe 107 delivered via the small diameter secondary tube 114 and into the sub-surface applicator 108 (e.g., FIG. 4b).

Figure 4C:
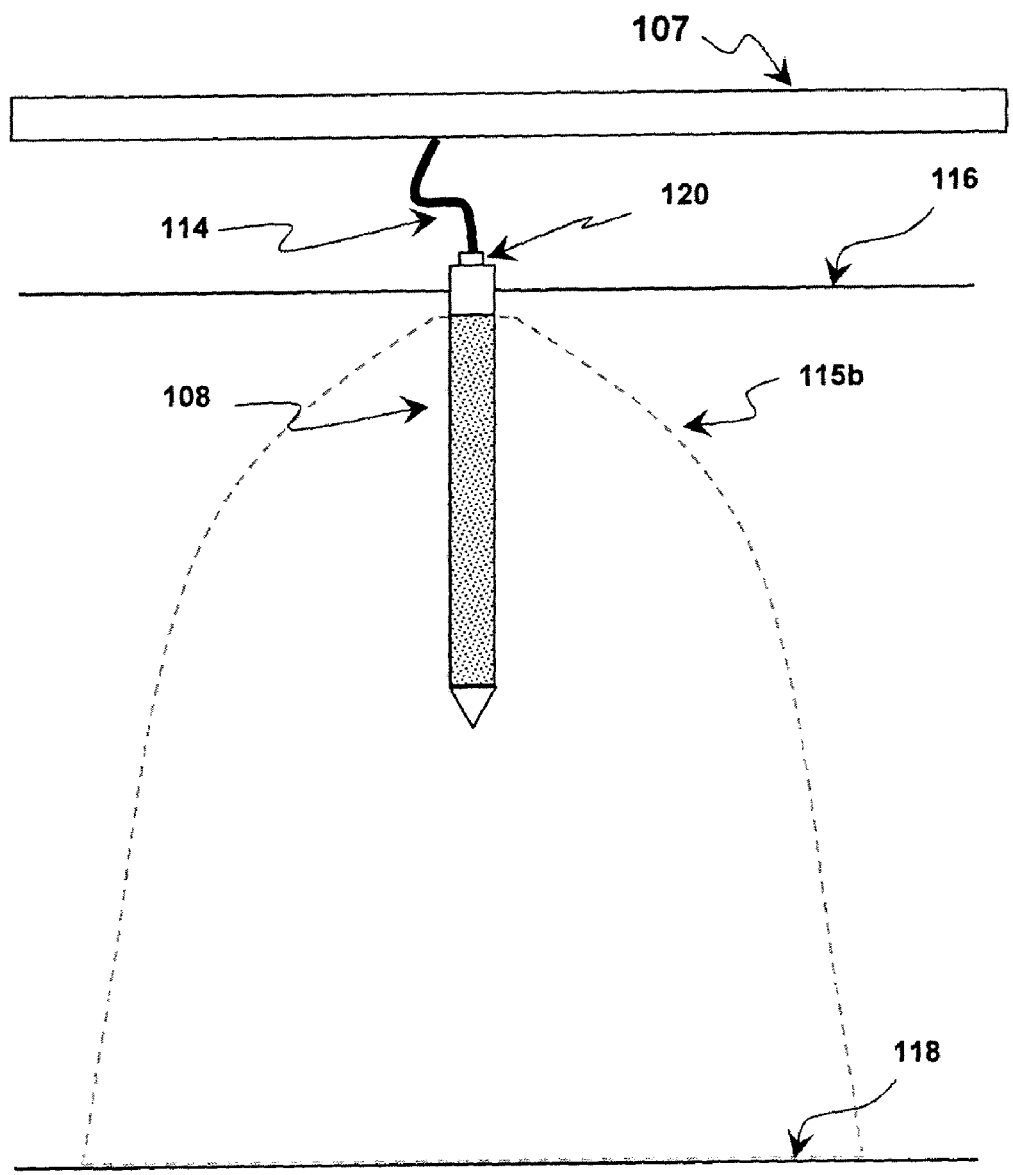

In still other embodiments of the invention, the sub-surface solution applicator 108 may further include pressure dissipation devices 120 operably connected to the applicators, in which case the solution is delivered to the ore under negative pressure via pressure dissipation device 120 or another device embedded within the body of the sub-surface solution applicator 108 (e.g., FIG. 4c).

Of course, the configuration and materials of the sub-surface solution applicators 108 can be modified in any fashion to provide solution at varying depths and pressures without departing from the spirit and scope of the present invention.

Figure 4D:
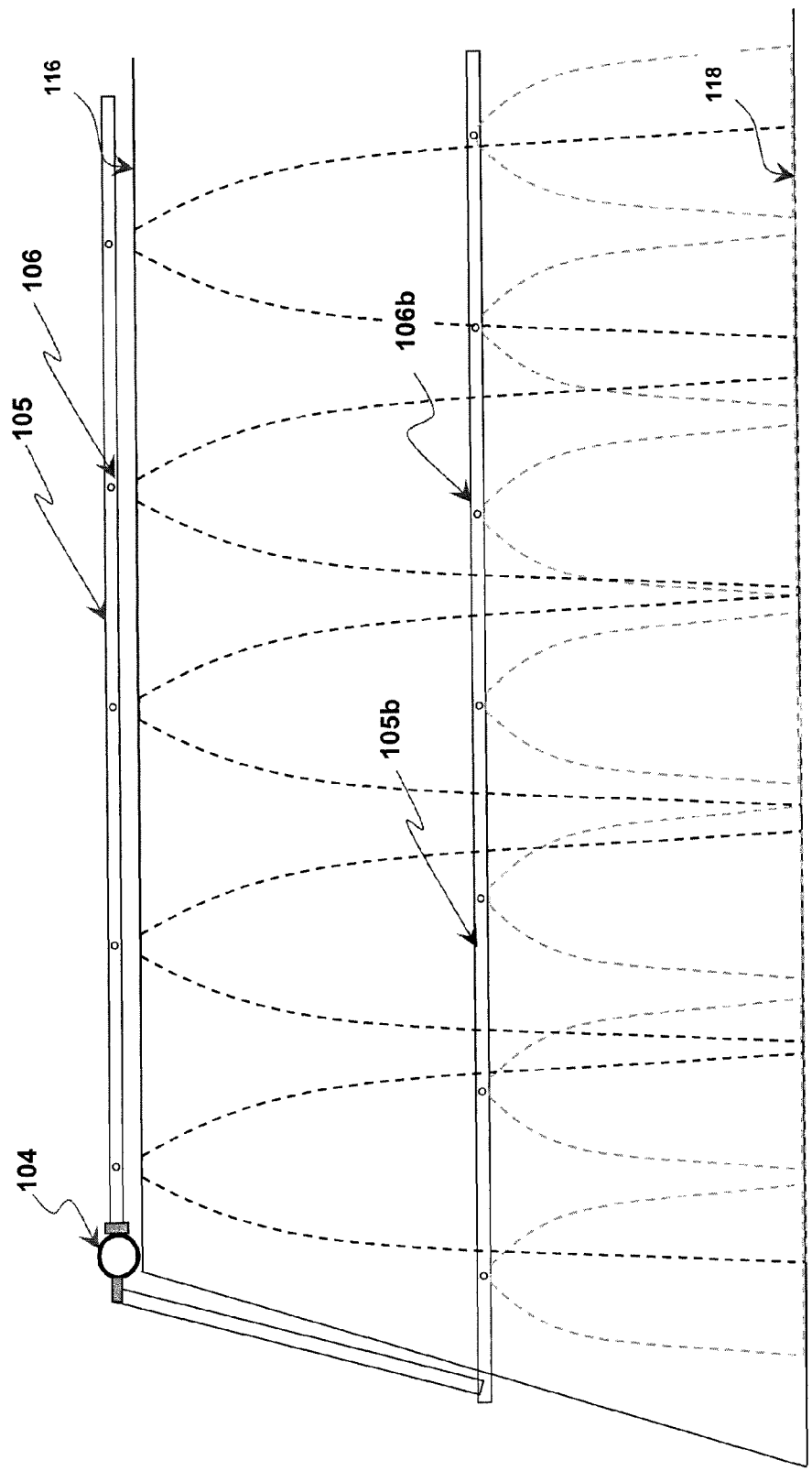

In yet other embodiments of the invention, sub-surface solution application can be accomplished by using a drip-irrigation pipe 105b and individual drip emitters 106b fluidly connected thereto, similar to the surface irrigation pipe 105 and the individual surface emitters 106 placed on heap surface 116, but installed at one or more elevations within the heap profile (e.g., FIG. 4d). The embodiments of the invention described above result in different wetting patterns that may be beneficially employed in a variety of ore hydrometallurgical characteristics.

In any case, the sub-surface solution applicator 108 and/or drip-irrigation pipe 105b penetrates or circumvents the surface of the heap bridging the surface crust and/or low hydraulic conductivity material deposited on the heap surface and allowing leaching solution/reagents to be delivered into the ore mass at any depth and pressure desired by the operators and/or dictated by the conditions of the heap and/or ore material.

Any one or more of the designs described herein may be optimally selected in view of the particular dynamics of the heap and the ore to be leached. The design of sub-surface solution applicators 108, drip-irrigation pipe 105b, and/or individual drip emitters 106b may be such that solution can be delivered to the heap at one or more positions along the depth of the applicator and heap profile. The sub-surface solution applicators 108 can be made of any material or composition known to one of ordinary skill in the art. For example, the sub-surface solution applicators 108 can be made of a polyvinyl chloride pipe with at least one exit orifice on the side, bottom, or top for delivery of leach solution. The structure of the sub-surface solution applicator 108 itself provides the ability to manage the pressure within the system as it is delivered to the heap.

The density (number of applicators per unit volume of ore) and depth of the sub-surface solution applicators 108 can be modified as a function of the hydrodynamic properties of the ore and as a function of the temporal changes arising during the leach cycle (compaction, surface decrepitation and scaling, changes in porosity, etc.).

In a preferred embodiment of the invention, a plurality of sub-surface solution applicators 108 are placed within the heap in combination with a surface solution delivery system comprising a plurality of surface emitters 106 to maximize and expedite the volume of solution and reagents delivered to the heap and to maintain substantially uniform distribution of solution/reagents into the ore mass. The depth of and spacing between the sub-surface solution applicators 108 are determined by the particular ore conditions and timing during the leach cycle, as is the appropriate mode of application. Preferably, the depth of solution delivery is sufficiently flexible to allow the applicator to reach any elevation within the heap profile.

For the case when atmospheric pressure is selected for the applicator, as in FIG. 4a, a small diameter secondary drip-tube 114, with or without a drip emitter or other solution delivery device, is then inserted into the sub-surface solution applicator 108, which can be slotted or perforated. The solution applied can then fill the sub-surface solution applicator 108, flow around and up the outside of the pipe thus increasing both the hydraulic head and the surface area at which the solution is applied. The result being, as the hydraulic properties of the ore change, the conditions most favorable for maintaining flow into the heap, area and hydraulic head, adjust accordingly.

In the case of a pressurized solution delivery, as in FIG. 4b, the sub-surface solution applicator 108, which can be slotted or perforated, is directly connected to the small diameter secondary drip-tube 114 and then to a commercial drip emitter or other pressure-regulating device, if desired. Solution is then delivered through open area along the sub-surface solution applicator 108 at the designed depth, creating a wetting front extending to heap bottom 118.

Solution can also be delivered under negative pressure, as in FIG. 4c, by incorporating pressure controller/reducer 120 connected or built-in to the applicator. Similarly, the sub-surface solution applicator 108 can be used to deliver a prescribed flow for the selected operational pressure.

Although several embodiments of this invention have been described above with a certain degree of particularity, those skilled in the art could make numerous alterations to the disclosed embodiments without departing from the spirit or scope of this invention.

All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A system for delivery of a leach solution to an ore heap in the process of percolation leaching, the system comprising:
   at least one main conduit for leach solution delivery from a reservoir;
   a surface solution delivery system connected to the at least one main conduit comprising a plurality of surface emitters distributed over at least a portion of a surface of the ore heap; and
   a sub-surface delivery system connected to the at least one main conduit for leach solution delivery to at least a portion of the ore heap below the surface of the ore heap, the sub-surface delivery system comprising:
      a plurality of sub-surface solution applicators configured to extend a predetermined distance into the ore heap to deliver leach solution into the ore heap through a plurality of delivery points,
   wherein each of the plurality of sub-surface solution applicators is capable of emitting leach solution over a range of operating pressures preselected as a function of hydraulic properties of the ore heap,
   wherein an initial operating pressure for each of the plurality of sub-surface solution applicators is preselected as a function of initial hydraulic properties of the ore heap, and
   wherein an instantaneous operating pressure of each of the plurality of sub-surface solution applicators varies in response to variations in the hydraulic properties of the ore heap.

2. The system of claim 1, wherein at least a portion of the range of operating pressures for at least one of the plurality of sub-surface solution applicators is below atmospheric pressure.

3. The system of claim 1, wherein at least a portion of the range of operating pressures for at least one of the plurality of sub-surface solution applicators is above atmospheric pressure.

4. The system of claim 1 wherein the plurality of sub-surface solution applicators are disposed within the ore heap in a substantially vertical position.

5. The system of claim 1 wherein the subsurface delivery system further comprises at least one sub-surface drip irrigation pipe extending into the ore heap, the plurality of sub-surface solution applicators being fluidly connected to the at least one sub-surface drip irrigation pipe.

6. The system of claim 1 wherein the plurality of sub-surface solution applicators are disposed within the ore heap in a substantially non-vertical position.

7. The system of claim 1 wherein the plurality of sub-surface solution applicators extends into the ore heap between about 0% and about 85% of an overall ore heap depth measured from the top surface of the ore heap.

8. The system of claim 1, wherein the plurality of sub-surface solution applicators are capable of varying a delivery pressure of the leach solution in response to variations in hydraulic properties of the ore heap.

9. The system of claim 1, wherein the pressure range over which each of the plurality of sub-surface emitters operates is preselected to distribute the leach solution in substantially uniform fashion at a preselected range of flow rates from the plurality of surface emitters and sub-surface solution applicators.

10. The system of claim 9, wherein a composite average solution flow rate of the system is between about 0.1 L/hr/m$^2$ and about 50 L/hr/m$^2$.

11. The system of claim 1 wherein at least one of the sub-surface solution applicators is connected to a pressurized reagent source capable of delivering gas-phase reagents to specific depths within the ore heap.

12. The system of claim 1 wherein the plurality of sub-surface solution applicators are configured and disposed in the ore heap at a sufficient depth to reduce heat loss and solution evaporation.

13. The system of claim 1 wherein the ore heap is comprised of low permeable ore.

14. The system of claim 1 wherein the ore heap is comprised of nickel laterite ore.

15. The system of claim 1, wherein the hydraulic properties include internal pore pressure of the ore heap.

16. The system of claim 7, wherein the plurality of sub-surface solution applicators extend into the ore heap between about 10% and about 85% of an overall ore heap depth measured from the top surface of the ore heap.

17. The system of claim 1, wherein the predetermined distance of each of the plurality of sub-surface solution applicators is determined as a function of the initial hydraulic properties of the ore heap.

18. A system for delivery of a leach solution to a nickel laterite ore heap in the process of percolation leaching, the system comprising:
   at least one main conduit for leach solution delivery from a reservoir;

a surface solution delivery system connected to at least one main conduit comprising a plurality of surface emitters distributed over at least a portion of the surface of the ore heap; and a sub-surface delivery system connected to the at least one main conduit for leach solution delivery to a plurality of locations within the nickel laterite ore heap at any depth, the sub-surface delivery system comprising a plurality of sub-surface solution applicators configured to extend a predetermined distance into the ore heap and to deliver leach solution into the ore heap through a plurality of delivery points, wherein each of the plurality of sub-surface solution applicators is capable of delivering the leach solution over a pressure range preselected as a function of initial hydraulic properties of the ore heap and to deliver the leach solution at pressures varying within the preselected pressure range in response to hydraulic properties of the ore heap and variations therein.

19. A method of applying leach solution to an ore heap in the process of percolation leaching, comprising:

positioning at least one surface emitter to deliver leach solution to at least a portion of a surface of the ore heap; and positioning at least one sub-surface solution applicator at a predetermined distance into the ore heap to deliver leach solution into the ore heap below the surface of the ore heap, wherein the at least one sub-surface solution applicator is capable of emitting leach solution over a range of operating pressures preselected as a function of hydraulic properties of the ore heap, wherein an initial operating pressure for the at least one sub-surface solution applicator is preselected as a function of initial hydraulic properties of the ore heap, and wherein an instantaneous operating pressure of the at least one sub-surface solution applicator varies in response to variations in the hydraulic properties of the ore heap.

20. The method according to claim 19, wherein at least a portion of the range of operating pressures for the at least one sub-surface solution applicator is below atmospheric pressure.

21. The method according to claim 19, wherein at least a portion of the range of operating pressures for the at least one sub-surface solution applicator is above atmospheric pressure.

22. The method according to claim 19, wherein the at least one sub-surface solution applicator extends into the ore heap between about 10% and about 85% of an overall ore heap depth measured from the surface of the ore heap.

23. The method according to claim 19, wherein the predetermined distance is determined as a function of the initial hydraulic properties of the ore heap.

24. The method according to claim 19, wherein the hydraulic properties include internal pore pressure of the ore heap.

* * * * *